Patented Feb. 24, 1931

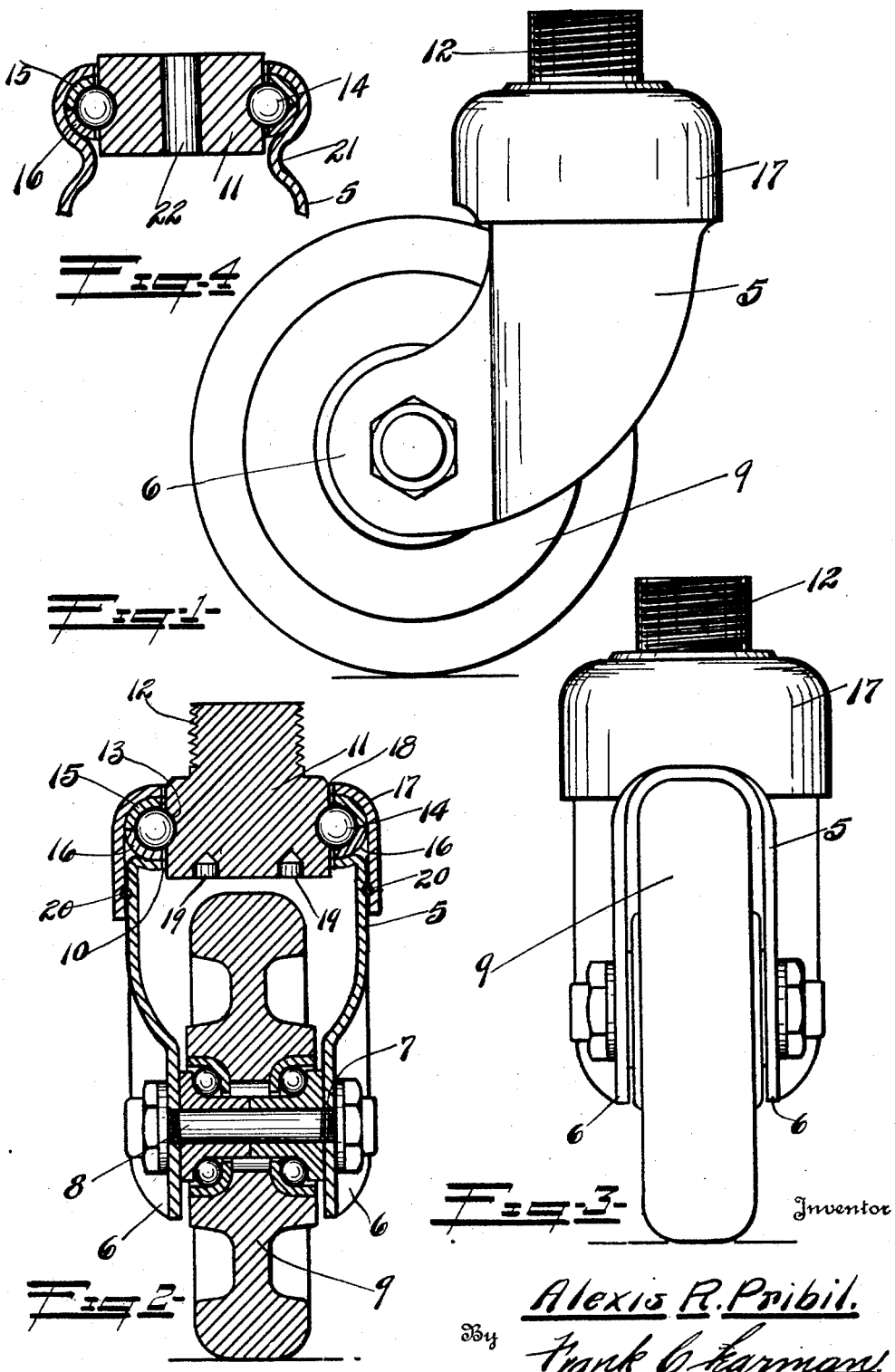

1,793,827

UNITED STATES PATENT OFFICE

ALEXIS R. PRIBIL, OF SAGINAW, MICHIGAN

CASTER

Application filed April 5, 1929. Serial No. 352,751.

This invention relates to casters and particularly to a swivel caster for application to furniture, hotel, and hospital equipment.

The prime object of the invention is to design a very neat and simple smooth operating swivel easier, which is of rigid and accurate construction, and which can be cheaply and easily manufactured and assembled.

Another object is to provide a swivel ball bearing dust proof caster, having a stamped frame and stamped and hardened raceways, which will not become loose and sloppy with long wear, and which can be subjected to severe shocks and heavy loads without distortion or binding.

A further object is to provide a swivel caster, and provide simple and inexpensive means for locking the wheel bearing frame to the swiveling mechanism.

The above and other objects will appear as the specification progresses, references being had to the accompanying drawing in which I have shown an embodiment of my invention, and in which like reference numerals indicate like parts throughout the several views thereof.

In the drawing.

Fig. 1 is a side view of a swivel caster embodying my invention.

Fig. 2 is a vertical sectional view thereof.

Fig. 3 is an opposite edge view.

Fig. 4 is a fragmentary sectional view showing an alternate construction.

As shown in the accompanying drawing, the caster comprises a wheel bearing frame 5 formed of a stamping, the lower end comprising a pair of spaced legs 6, in which suitable openings 7 are provided to accommodate an axle member 8, and on which a wheel member 9 is rotatably mounted.

The upper end of the frame is cylindrical in shape, and is provided with a centrally disposed aperture 10, which is adapted to accommodate a steel swivel bearing member 11, said member having a shouldered reduced upper threaded section 12, which is adapted to have threaded engagement with the article to which it is attached for securing it in position.

A ball groove 13 is provided intermediate the length of the member 11 as shown, and is adapted to accommodate a plurality of anti-friction balls 14, said bearing being carbonized and hardened to insure long service with minimum wear. Stamped sections 15 and 16 respectively form the outer raceway, and these are case hardened and then coined, said sections being held in place by means of an annular cap member 17, which is also formed with a centrally disposed opening 18 adapted to accommodate the bearing.

Spaced apart openings 19 are provided in the bottom of the bearing member 11 and accommodate a special wrench, (not shown), to facilitate attaching the caster in position, and I wish to direct special attention to the fact that the caster can be removed only by use of the aforesaid wrench.

In order to secure the cap member and wheel frame together, I provide a wire ring section 20 which is interposed between the upper end of the wheel bearing and the cap, and in order to facilitate the assembling, the cap member 17 is slightly flared, the cylindrical end of the wheel frame is then inserted in the member 17, and the wire ring is then dropped in position, the flared end is then compressed, and the ring bites into the walls of the wheel frame and cover respectively, securely locking the members together and making it impossible for any unauthorized person to remove and carry away the various parts.

In Fig. 4 I have shown a slightly different construction, this comprises a bearing member 11, having a centrally disposed opening 22 adapted to receive a bolt or the like for securing it to the article to which it is attached, the metal being constricted as shown at 21, to support and secure the raceway in position.

From the foregoing description, it will be obvious that I have perfected a very simple, substantial, and neat dust proof ball bearing swivel caster.

What I claim is:—

1. A caster of the class described comprising a stamped frame having an aperture in the upper end thereof, a swivel bearing extending into said aperture, a ball groove in the swivel bearing, an outer raceway and a cap member embracing said raceway, the lower end fitting over and having rigid interlocking connection with the frame.

2. A caster of the class described comprising a stamped wheel frame provided with an inwardly projecting flange, a swivel bearing projecting into said frame and provided with a ball groove, stamped raceways surrounding said groove and supported on said frame, a cap member fitted over said raceway and conforming to the curvature thereof, and interlocking means engaging said cap member and frame for rigidly securing them together.

In testimony whereof I affix my signature.

ALEXIS R. PRIBIL.